United States Patent [19]

Dawson et al.

[11] 4,229,224

[45] Oct. 21, 1980

[54] CEMENTITIOUS COMPOSITIONS

[75] Inventors: David G. Dawson, High Wycombe; Desmond W. J. Osmond, Windsor; Maurice W. Skinner, Maidenhead; Edmund J. West, High Wycombe, all of England

[73] Assignee: Imperial Chemical Industries Limited, London, England

[21] Appl. No.: 14,247

[22] Filed: Feb. 22, 1979

[30] Foreign Application Priority Data

Feb. 22, 1978 [GB] United Kingdom ............... 7041/78
Nov. 20, 1978 [GB] United Kingdom ............. 45296/78

[51] Int. Cl.$^2$ ............................................. C08L 00/00
[52] U.S. Cl. ............................... 106/90; 260/29.6 S
[58] Field of Search ....................... 260/29.6 S; 106/90

[56] References Cited

U.S. PATENT DOCUMENTS

| | | | |
|---|---|---|---|
| 2,868,753 | 1/1959 | Morgan et al. | 260/29.6 S |
| 3,197,428 | 7/1965 | Siegele | 260/29.6 S |
| 3,360,493 | 12/1967 | Evans | 260/29.6 S |
| 3,547,853 | 12/1970 | Kalandiak | 260/29.6 S |
| 3,937,633 | 2/1976 | Knight et al. | 260/29.6 S |
| 4,002,713 | 1/1977 | Duncan et al. | 260/29.6 S |
| 4,043,827 | 8/1977 | Bernett | 260/29.6 S |

*Primary Examiner*—James Poer
*Attorney, Agent, or Firm*—Cushman, Darby & Cushman

[57] ABSTRACT

In U.S. Pat. No. 4,070,199 we have described cured polymer-containing cementitious compositions of high modulus of rupture. The cured compositions are made by curing the product of subjecting to a homogenization process comprising high shear mixing (e.g. extrusion or calendering) the ingredients hydraulic cement, water and a selected water-dispersible polymer. The polymer is selected by a test which determines thermally its effect on the cement hydration reaction. The present invention describes the use in similar compositions of a class of water-dispersible acidic polymer, not selected by the above-mentioned test, which contains a specified proportion of carboxyl groups.

Shaped products comprised of the new cured compositions of high modulus of rupture are useful, for example, in building applications where previously it was necessary to employ asbestos in admixture with the cement.

13 Claims, No Drawings

CEMENTITIOUS COMPOSITIONS

This invention relates to uncured and to cured homogeneous cementitious compositions; to methods of producing, and to articles which are comprised of, these compositions. The cured cementitious compositions are of high strength; in particular the cured compositions have a notably high modulus of rupture.

In our earlier filed Specification U.S. Pat. No. 4,070,199 we have described and claimed a homogeneous uncured cementitious composition which comprises the ingredients:

(a) a hydraulic cement,
(b) water, and
(c) a water-dispersible polymer wherein:

(i) the ratio of water to hydraulic cement is in the range 10–28 parts by weight of water to 100 parts by weight of hydraulic cement;
(ii) the water-dispersible polymer is selected with reference to the hydraulic cement and to the selected proportions of water and cement for its suitability to facilitate homogenisation as therein defined and to yield on homogenisation a product which can be shaped under pressure and which is shape-retaining; and
(iii) the ratio of water-dispersible polymer to hydraulic cement is in the range 0.1–3.0 parts by weight of water-dispersible polymer to 100 parts by weight of hydraulic cement.

The ingredients (a), (b) and (c) are jointly subjected to a homogenisation process (as therein defined) and, optionally, are shaped, such that on curing and drying, the homogeneous uncured composition yields a cured, dried and optionally shaped cementitious material having a modulus of rupture greater than 15 MN/m$^2$.

Preferably the cured and dried cementitious composition has a modulus of rupture greater than 20 MN/m$^2$ and more preferably the cured and dried cementitious composition has a modulus of rupture greater than 30 MN/m$^2$.

We have also described methods of producing the homogeneous uncured cementitious composition as defined above, methods of producing cured and dried, and optionally shaped, compositions of high strength and shaped articles which comprise a cured and dried cementitious composition as described above.

The cured and dried compositions described in our earlier patent application have a modulus of rupture which is significantly greater than that which can be expected for a cured and dried paste prepared by conventional procedures.

We believe, but without limitation to this belief, that the remarkably high modulus of rupture of the matrix of the cured cementitious compositions described in our earlier application is due, inter alia, to the regular dispersion throughout the matrix of the selected ingredients hydraulic cement, water and suitable water-dispersible polymer by an efficient homogenisation process or processes which comprises or comprise high shear mixing and which may include, for example, extrusion and/or calendering. We also believe that it is essential to the production of a cured and dried high strength matrix, of which a cured composition is comprised, that regard is paid to the following factors in the preparation of the matrix: (a) the selection of a suitable water-dispersible polymer; (b) the use of a very low water/cement ratio having regard to the presence of other ingredients, but always less than 0.28; (c) the production of a homogeneous regularly-dispersed mixture of the ingredients, for example by a homogenisation process or processes which may comprise an extrusion or a calendering process; (d) the curing and drying of the composition under optimum conditions for the production of high strength cements.

In another patent application we have described certain uncured and cured homogeneous cementitious compositions which comprise a fine aggregate of which 75% by weight passes a sieve of aperture 1 mm. The incorporation of the aggregate can result in a significant increase in the modulus of rupture of the cured compositions.

In our earlier application we described a test method, whereby particularly useful water-dispersible polymers could be selected, in which the rate of heat evolution of a mixture of a polymer under test, hydraulic cement and water was compared with the rate of heat evolution of a mixture of hydraulic cement and water alone. We have now found that a class of particularly useful polymers, which contain a certain proportion of carboxyl groups, is not selected by this test.

We have found that copolymers containing a very high proportion of carboxyl groups are unsatisfactory for use in preparing the compositions of our earlier application, described above, since at the low levels of water employed the uncured compositions are not amenable to shaping. We have also found that copolymers containing a low proportion of carboxyl groups are unsatisfactory since the compositions may not be amenable to shaping and they do not provide products of high modulus of rupture. Surprisingly we have found that copolymers having a selected proportion of carboxyl groups provide compositions which are amenable to shaping and when cured are of high strength.

Thus according to this invention we provide a homogeneous uncured cementitious composition which comprises the ingredients:

(a) a hydraulic cement as herein defined,
(b) water, and
(c) a water-dispersible polymer as herein defined selected from those polymers which contain carboxyl groups and which have a total carboxyl content equivalent to at least 50 mg KOH/g of polymer, and which have a pK$_a$ in the range 3–10;

and wherein:

(i) the ratio of water to hydraulic cement is in the range 10–28 parts by weight of water to 100 parts of hydraulic cement;
(ii) the ratio of the water-dispersible polymer to hydraulic cement is in the range 0.1–10.0 parts by weight of water-dispersible polymer to 100 parts by weight of hydraulic cement; and
(iii) the water-dispersible polymer is further selected as herein defined with reference to the hydraulic cement and to the selected proportions of water and hydraulic cement for its suitability to facilitate homogenisation and to yield on homogenisation a product which can be shaped under pressure and which product is shape retaining;

and wherein the ingredients (a), (b) and (c), are jointly subjected to a homogenisation process and, optionally, are shaped such that on curing and drying, the homogeneous uncured composition yields a cured, dried and optionally shaped cementitious material having a modulus of rupture greater than 15 MN/m$^2$.

Preferably the ratio of polymer to hydraulic cement is in the range 0.1–3.0 parts.

Preferably the modulus of rupture of the cured composition is greater than 20 $MN/m^2$ and more preferably is greater than 30 $MN/m^2$.

By the term "water-dispersible polymer" as used in this specification we mean a polymer which can be dispersed in water, optionally in the presence of an alkali and/or optionally in the presence of a surfactant, to produce, for example, a stable fine dispersion of polymer particles, e.g. a latex or an emulsion, a micellised solution or any other form of solution or apparent solution of the polymer.

The carboxyl group-containing water-dispersible polymer is preferably dispersed in water before it is added to the hydraulic cement. In such a case the dispersion of the polymer may be brought about or may be aided by the presence of an alkali and/or a surfactant. Suitable alkalis include ammonium hydroxide and the alkali metal hydroxides. The polymer dispersion may be prepared from a substantially pure polymer as one starting ingredient. Alternatively the polymer dispersion may comprise that dispersion which has resulted from a polymerisation in an aqueous medium of suitable monomers, including for example a carboxyl group-containing monomer, in the presence of a suitable surfactant. Alternatively the polymer dispersion may be prepared by adding water to a substantially dried product obtained from such a polymerisation process. Suitable polymers which are commercially available as aqueous dispersions include "Viscalex" HV30 (Allied Colloids Limited). Suitable polymers which are available as substantially dried polymerisation products include "Rohagit" S. (Röhm GmbH).

The polymer may also be dispersed in water after it is brought into contact with the hydraulic cement and this may be aided or brought about in the presence of an alkali and/or a surfactant. Alkaline materials arising from the action of water on the hydraulic cement, for example sodium, potassium or calcium hydroxide, may also aid or bring about the dispersion of the polymer.

A preferred requirement of the water-dispersible polymer used in this invention is that when the polymer is dispersed or solubilised in water it has such a significant effect on the rheology of water, or more particularly on the rheology of the aqueous cement paste, that the dispersion or solution can facilitate the homogenisation and shaping of the uncured cementitious composition and that the product has a satisfactory shape-retention. Preferably the water-dispersible polymer has an appreciable effect on the viscosity of water at a pH close to neutrality. Preferably the viscosity of the dispersion or solution in water is greatly increased in the presence of alkalis, for example, in the presence of ammonium hydroxide or the alkali metal hydroxides.

When an otherwise suitable polymer does not possess to a desired extent the required properties or property of facilitating homogenisation and/or of facilitating shaping of the uncured composition and/or of facilitating shape retention of the shaped product, then there may be used in the uncured, cementitious composition a further auxiliary ingredient which does have one or more of these properties. Suitable such ingredients include, for example, the hydroxy alkyl ethers of celluloses, polyethylene oxides or polyvinyl pyrrolidone.

The suitability of any polymer to facilitate homogenisation and/or shaping and/or shape retention of an uncured cementitious composition may be determined by the following test method:

A 100 g mass of a composition comprising cement, water and polymer mixed in chosen proportions in a planetary motion mixer is roughly formed into thick disc and placed in the centre of a Perspex plate $\frac{3}{8}''$ thick. A similar Perspex plate of known weight is placed on top of the cement paste and spacers of $\frac{3}{8}''$ are placed between the plates which are then pushed together. The area covered by the composition is measured; if this area is not 60 $cm^2 \pm 5\%$ the test is restarted with the mass of paste adjusted appropriately.

The spacers are removed and a known load applied to the top plate (over the centre of the disc of material) in order to push the plates together. When the composition has stopped spreading, its area is measured and a further load is applied to the top surface. This process is repeated until the area covered by the cement paste is approximately three times the starting area.

The yield stress of the composition for each weight in $kg/cm^2$ is calculated from the area covered and the load applied. The common log of yield stress is then plotted against the area in $cm^2$ covered by the sample. It has been found that a suitable material must have an initial yield stress of 0.05 $kg/cm^2$ and preferably 0.1 $kg/cm^2$. Where the plot of log yield stress against area is linear, the slope must be at least 0.00176 $kg/cm^2$, and where the plot is not linear it should be concave towards the x axis. If the slope is greater than 0.1 $kg/cm^2$ or the plot is concave upwards, it will be found that in an extrusion process, for example, the composition will become more difficult to extrude with increase of applied pressure.

Preferably the water-dispersible carboxyl group-containing polymer of this invention has a total carboxyl content equivalent to at least 100 and more preferably at least 200 mg KOH/g of polymer. Preferably the maximum carboxyl content of the polymer is equivalent to a maximum of 780 mg KOH/g of polymer, more preferably is equivalent to a maximum of 700 mg KOH/g and still more preferably, to a maximum of 500 mg KOH/g. The $pK_a$ of an acid HA is derived from $pK_a = -\log_{10} K_a$ where $K_a = [H+][A+]/[HA.]$ Particularly suitable water-dispersible polymers as herein defined are addition polymers and such polymers are usually copolymers. Carboxyl group-containing condensation polymers or other carboxyl-containing polymers may also be used.

Suitable addition copolymers include copolymers of methyl methacrylate with methacrylic acid, acrylic acid, crotonic acid, itaconic acid or similar unsaturated carboxylic acids; copolymers of methyl methacrylate with ethyl acrylate, 2 ethyl hexyl acrylate, butyl acrylate or similar esters of acrylic acid, together with acids of the above type; copolymers of vinyl acetate with esters of acrylic acid, methacrylic acid, crotonic acid or similar unsaturated acid, subsequently modified to produce carboxyl groups; copolymers of vinyl acetate with acrylic acid, methacrylic acid, crotonic acid and similar unsaturated acids or salts of these acids; copolymers of vinyl pyrrolidone with acrylic acid, methacrylic acid, crotonic acid or similar unsaturated acid, and which can also include as monomers esters of these acids; copolymers of anhydrides of unsaturated acids, such as maleic acid, with suitable unsaturated monomers such as styrene, di-isobutylene, methyl vinyl ether; partially hydrolised polymers and copolymers of acrylamide, methacrylamide and acrylonitrile; graft copolymers of polyethylene oxide with copolymers of acrylic acid, methacrylic acid etc., and methyl acrylate, methyl methacrylate.

Preferably the addition polymer comprises moieties of acrylic or methacrylic acid. Particularly suitable polymers are those which in the free acid form can exist as a stable fine dispersion of polymer particles in water.

Preferably the molecular weight of the water-dispersible polymer in one aspect of the invention is greater than 100,000 (viscosity average).

All of the above polymers may, optionally, include crosslinking difunctional monomers such as divinyl benzene, and mixtures of the polymers may be used.

Suitable commercially available polymers are: "Rohagit S", which is believed to be an addition copolymer based on acrylic acid (containing approximately 60% by weight of acrylic acid) having a $pK_a$ value of 6.4 and a carboxyl content equivalent to 397 mg KOH/g of polymer; "Viscalex" HV30 (Allied Colloids Limited) which is believed to be an addition copolymer based on methyl methacrylate/ethyl acrylate/acrylic acid having a $pK_a$ of 6.6 and a carboxyl content equivalent to 247 mg KOH/g of polymer; and "Primal" ASE-60 (Rohm & Haas) which is a crosslinked acrylic copolymer having a $pK_a$ of 6.6 and a carboxyl content equivalent to 238 mg KOH/g of polymer.

By the term "hydraulic cement" we mean those cements which comprise one or more compounds which are a combination of one or more of the elements calcium, aluminium, silicon, oxygen and/or sulphur and which set and harden by reaction of these compounds with water. This definition will include those cements commonly classed as Portland cements, for example, ordinary Portland cement, rapid hardening and extra-rapid hardening Portland cements, sulphate-resisting Portland cement and other modified Portland cements; those cements commonly known as aluminous, high alumina cements, or calcium aluminate cements; gypsum; pozzolanic cements; and varieties of the foregoing cements containing small quantities of accelerants, retarders, air entraining agents, etc. Mixtures of these cements may be used.

When the uncured cementitious compositions of this invention as described above are cured and dried the products have a high modulus of rupture. The modulus of rupture is often higher in value than when are used the polymers described in our earlier application for example hydroxyl propyl methyl cellulose. Moreover the polymers of this invention may be cheaper than polymers such as the cellulose ethers.

Thus, according to further aspects of the present invention we provide cured, and optionally shaped, cementitious compositions obtained by curing, and optionally shaped the uncured homogeneous cementitious compositions described above; and methods of producing said compositions and shaped articles. The cured compositions have improved properties.

The curing conditions are selected to maximise in the product the modulus of rupture and suitable conditions are described in the Examples below.

The compositions and articles of this invention may comprise fibre, for example nylon, polypropylene or glassfibre. Preferably the compositions and articles contain not more than 1% of mineral fibre and preferably they are free from asbestos fibre in view of the hazard presented by this fibre to health. It is an advantage of this invention that asbestos-free articles of high modulus of rupture may be produced which may replace similar articles in which asbestos has been conventionally used.

The compositions and articles of the present invention may comprise fibre in a proportion which is less than, equal to or greater than the critical volume fraction of the fibre.

The compositions and articles of the present invention may comprise an aggregate as described above.

The compositions and articles of the present invention may also comprise other ingredients which are known to find use in cementitious compositions, for example polymer latices and pigments.

With regard to homogenisation, and shaping of ingredients (a), (b) & (c) by a process which comprises extrusion, preferred extrusion pressures are 500–7500 p.s.i., more preferably 2,000–5,000 p.s.i. (ram) & 500–1500 p.s.i. (screw).

The invention is illustrated by the following Examples in which parts and percentages are by weight unless otherwise stated:

EXAMPLE 1

This Example shows the improvement in modulus of rupture when hydroxy propyl methyl cellulose, a typical water-dispersible polymer exemplified in our earlier patent application, is replaced by a crosslinked acrylic addition polymer containing carboxyl groups.

(a) The following ingredients were weighed out and mixed together in a Werner-Pfleiderer "pug" mixer.

| | | Parts by Weight |
|---|---|---|
| Rapid hardening Portland cement | | 100 |
| High alumina cement (Ciment fondu) | | 5 |
| Water | | 19.32 |
| A crosslinked acrylic addition copolymer having a carboxyl equivalent to 238 mg KOH/g and pKa 6.6 (commercially available as "Primal" ASE-60) | added together as an 8% by weight dispersion | 1.68 |
| Nylon fibre (20 denier/10mm length) | | 0.5 |

Mixing was continued for 20 minutes at which time the composition had a crumbly texture. The material was then placed in the barrel of a ram extruder, air was evacuated under a vacuum of 740–760 mm mercury for 3 minutes. The material was then extruded through a tubular die 14 mm in diameter at a pressure of 24.7 MPa. Samples of the extruded material were placed in sealed polythene bags and left for 24 hours to set. They were then placed in a water fog chamber for 7 days and finally allowed to dry for 14 days in an atmosphere of 50–55% Relative Humidity at a temperature of 20° C. The cured samples were then tested in a 3-point bending test and the modulus of rupture was calculated applying the Euler-Bernouli theory of bending. The mean modulus of rupture of the samples was found to be 35.7 MN/m$^2$.

(b) Cured samples prepared in a manner similar to that described in (a) above, but using a commercially available hydroxy propyl methyl cellulose ("Celacol" HPM-15000 DS) in place of the crosslinked acrylic copolymer, were found to have a mean modulus of rupture 32.6 MN/m$^2$.

EXAMPLE 2

The following ingredients were weighed out, mixed and extruded as described in Example 1(a):

| | Parts by Weight |
|---|---|
| Rapid hardening Portland cement | 100 |
| High alumina cement (Ciment fondu) | 5 |
| Water | 19.32 |
| A commercially available addition copolymer, believed to be methyl methacrylate/ethyl acrylate /acrylic acid, having a carboxyl content equivalent to 247 mg KOH/g of polymer & a pKa of 6.6 ("Viscalex" HV 30) — added together as an 8% by weight dispersion. | 1.68 |
| Nylon fibre (20 denier/10mm length) | 0.5 |

When allowed to cure and dry as described in Example 1(a) and when tested in the 3-point bending test, the mean modulus of rupture of several samples prepared from the above ingredients was found to be 40.5 MN/m$^2$.

EXAMPLE 3

In this Example an addition polymer in the acid form was added as a slurry to the hydraulic cement.

The following ingredients were weighed out, mixed, extruded, cured and dried as in Example 1(a).

| | Parts by Weight |
|---|---|
| Rapid hardening Portland cement | 100 |
| High alumina cement (Ciment fondu) | 5 |
| An acrylic copolymer based on approximately 60% by weight of acrylic acid having a carboxyl content equivalent to 397 mg KOH/g of polymer & a pKa of 6. (commercially available as "Rohagit" S (MV.)) — added together as a 4% slurry | 0.84 |
| Water | 20.26 |
| Nylon fibre (20 denier/10mm length) | 0.5 |

The mean modulus of rupture of several cured and dried samples prepared as described above was 34.1 MN/m$^2$.

EXAMPLE 4

In this Example is illustrated the use in an extrusion process of a carboxyl group-containing polymer having a carboxyl content equivalent to less than 50 mg KOH/g of polymer i.e. not according to the invention. The modulus of rupture of the product was much lower than when the carboxyl content of the polymer was equivalent to a value greater than 50 mg KOH/g.

The following ingredients were mixed as in Example 1(a):

| | Parts by Weight |
|---|---|
| Rapid hardening Portland cement | 100 |
| High alumina cement (Ciment fondu) | 5 |
| A commercially available vinyl acetate/crotonic acid copolymer having a carboxyl content equivalent to 36 mg KOH/g of polymer. ("Vinamul" 6000) — added together as an 8% dispersion | 1.56 |
| Water | 17.94 |
| Nylon fibre (20 denier/10 mm length) | 0.5 |

The mix was charged to the ram extruder and extruded at a pressure of 8.6 MPa. The extrudate was of low green strength. When cured and dried as in Example 1(a), a mean modulus of rupture of 15.7 MN/m$^2$ was obtained.

EXAMPLE 5

The following ingredients were weighed out and mixed as described in Example 1(a):

| | Parts by Weight |
|---|---|
| Rapid hardening Portland cement | 100 |
| High alumina cement | 5 |
| Water | 19.32 |
| A non-crosslinked carboxyl group-containing acrylic polymer having a carboxyl content equivalent to 483 mg KOH/g of polymer and a pKa >6. ("Primal" ASE 95 : available from Rohm & Haas) — added together as an 8% by weight dispersion | 1.68 |
| Chopped Nylon fibre (20 denier/10 mm length) | 0.5 |

The mix was charged to the barrel of a ram extruder, evacuated for 3 minutes and then extruded at a pressure of 34.5 MPa.

After curing and drying as in Example 1(a) several samples were tested in a 3-point bending test and gave a mean modulus of rupture of 40 MN/m$^2$. A similar result was obtained when the High Alumina cement was replaced by an equal weight of rapid hardening Portland cement.

EXAMPLE 6

In this Example an aqueous dispersion of carboxyl group-containing polymer was neutralised with ammonia before addition to the cement.

1000 parts of a commercially available emulsion of a carboxyl group-containing acrylic polymer of carboxyl content equivalent to 219 mg KOH/g of polymer and pKa>6 ("Primal" ASE 75) was diluted with water to give an 8% solids solution. It was then totally neutralised with 75 parts of concentrated ammonia solution ("880 ammonia" at 35% w/w NH$_3$).

The following ingredients were then weighed out:

| | Parts by Weight |
|---|---|
| Rapid hardening Portland cement | 100 |
| High alumina cement (Ciment fondu) | 5 |
| Diluted "Primal" ASE 75, ammonia neutralised | 21 |

-continued

| | Parts by Weight |
|---|---|
| Polypropylene fibre (3 denier/10 mm length) | 0.5 |

The ingredients were thoroughly mixed in a Werner-Pfleiderer "pug" mixer and then charged to the barrel of a ram extruder. Air was evacuated under a vacuum of 740–760 mm mercury for 3 minutes. The material was then extruded through a tubular die 14 mm in diameter at a pressure of 14.7 MPa (2140 p.s.i.) The extruded material was allowed to set for 24 hours sealed in polythene bags, and then placed in a fog chamber for 7 days and subsequently dried at 50% Relative Humidity and 20° C. for 14 days. Samples were then tested in a 3-point bending test and the modulus of rupture calculated applying the Euler-Bernouli theory of bending.

The mean modulus of rupture of the samples was found to be 35.5 MN/m$^2$.

EXAMPLE 7

The following Example illustrates the use of a water soluble carboxyl-containing polymer dispersed in the presence of sodium hydroxide.

A quantity of water soluble cross-linked acrylic polymer commercially available as "Primal" ASE 95 containing carboxyl groups and having a total carboxyl content equivalent to 480 mg KOH/g polymer was fully neutralised with sodium hydroxide solution and the concentration adjusted to 8% polymer solids. The following ingredients were then taken in the proportions shown:

| | Parts by Weight |
|---|---|
| Rapid hardening Portland cement | 100 |
| High alumina cement (Ciment fondu) | 5 |
| Diluted, neutralised "Primal" ASE 95 (Equivalent to 1.60 parts by weight of polymer and 18.4 parts by weight of water). | 20 |
| Polypropylene fibre (3 denier, 10mm length) | 0.5 |

These components were mixed for 20 minutes in a Werner-Pfleiderer 'pug' mixer to give a soft dough. This material was then charged to the barrel of a ram extruder. Air was evacuated for 3 minutes under a vacuum of 740–760 mm mercury. The material was then extruded through a 14 mm diameter tubular die under a pressure of 23–25 MPa. The extruded material was allowed to set in sealed plastic bags for 24 hours and was then cured in a fog chamber at 20° C. for 7 days. Samples of the extruded material were finally dried for 14 days in an atmosphere of 50% R.H. At 20° C. Samples were then tested in a 3-point bending test. The mean modulus of rupture was found to be 37.8 MN/m$^2$.

A similar result was obtained when the mixture of Portland & High Alumina cement was replaced wholly by Portland cement.

We claim:

1. A homogeneous uncured cementitious composition which comprises the ingredients:
   (a) a hydraulic cement,
   (b) water, and
   (c) a water-dispersible polymer selected from those polymers which contain carboxyl groups and which have total carboxyl content equivalent to at least 50 mg KOH/g of polymer, and which have a pK$_a$ in the range of 3–10;
   and wherein:
   (i) the ratio of water to hydraulic cement is in the range of 10–28 parts by weight of water to 100 parts of hydraulic cement:
   (ii) the ratio of the water-dispersible polymer to hydraulic cement is in the range 0.1–10.0 parts by weight of water-dispersible polymer to 100 parts by weight of hydraulic cement; and
   (iii) the water-dispersible polymer is further selected with reference to the hydraulic cement and to the selected proportions of water and hydraulic cement for its suitability to facilitate homogenisation and to yield on homogenisation a product which can be shaped under pressure and which product is shape retaining;
   and wherein the ingredients (a), (b) and (c), have been jointly subjected to a homogenisation process and, optionally, are shaped such that on curing and drying, the homogeneous uncured composition yields a cured, dried and optionally shaped cementitious material having a modulus of rupture greater than 15 MN/m$^2$.

2. A homogeneous composition according to claim 1 wherein there is present 0.1–3.0 parts by weight of the polymer to 100 parts by weight of hydraulic cement.

3. A homogeneous composition according to claim 1 wherein the minimum total carboxyl content of the polymer is equivalent to 100 mg KOH/g.

4. A homogeneous composition according to claim 1 wherein the maximum carboxyl content of the polymer is equivalent to 700 mg KOH/g.

5. A homogeneous composition according to claim 1 wherein the polymer is an addition copolymer.

6. A homogeneous composition according to claim 1 wherein the polymer comprises moieties of acrylic acid or methacrylic acid.

7. A homogeneous composition according to claim 1 wherein the molecular weight of the polymer is greater than 100,000.

8. A homogeneous composition according to claim 1 which comprises a fibre other than asbestos.

9. A homogeneous composition according to claim 8 which comprises nylon or polypropylene fibre.

10. A homogeneous composition according to claim 1 wherein the ingredients have been subjected to extrusion and/or calendering.

11. A cureed and dried cementitious composition having a modulus of rupture greater than 15 MN/m$^2$ prepared from a composition according to claim 1.

12. A method of preparing a composition according to claim 1 wherein the ingredients (a), (b) and (c) are subjected to extrusion and/or calendering.

13. A shaped article which comprises a cured and dried composition according to claim 11.

* * * * *